United States Patent
Kulkarni et al.

(10) Patent No.: US 9,418,184 B2
(45) Date of Patent: Aug. 16, 2016

(54) DETERMINING FLOW THROUGH A FRACTURE JUNCTION IN A COMPLEX FRACTURE NETWORK

(71) Applicant: Halliburton Energy Services, Inc., Houston, TX (US)

(72) Inventors: Pandurang Manohar Kulkarni, Houston, TX (US); Sojwal Manoorkar, New York, NY (US); Jeffrey Morris, Bronx, NY (US); Narongsak Tonmukayakul, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 519 days.

(21) Appl. No.: 13/951,145

(22) Filed: Jul. 25, 2013

(65) Prior Publication Data

US 2015/0032425 A1     Jan. 29, 2015

(51) Int. Cl.
*G06G 7/48* (2006.01)
*G06F 17/50* (2006.01)
*C09K 8/62* (2006.01)
*E21B 43/26* (2006.01)

(52) U.S. Cl.
CPC .............. *G06F 17/5009* (2013.01); *C09K 8/62* (2013.01); *E21B 43/26* (2013.01); *G06F 2217/16* (2013.01)

(58) Field of Classification Search
CPC ... G05B 19/418; E21B 43/26; E21B 47/1015; E21B 43/267; E21B 41/0064; C09K 8/62; C09K 8/685; C09K 8/68; F16J 15/20; G06F 17/5009
USPC .......................................................... 703/21
See application file for complete search history.

(56) References Cited

U.S. PATENT DOCUMENTS

| | | | | |
|---|---|---|---|---|
| 4,398,416 A | * | 8/1983 | Nolte | E21B 43/26 166/250.1 |
| 5,435,391 A | * | 7/1995 | Jones | E21B 43/14 166/278 |
| 6,601,646 B2 | * | 8/2003 | Streich | E21B 34/06 166/278 |
| 6,749,022 B1 | * | 6/2004 | Fredd | C09K 8/66 166/250.1 |
| 8,991,499 B2 | * | 3/2015 | Nevison | E21B 43/26 166/177.5 |
| 9,145,766 B2 | * | 9/2015 | Fripp | E21B 34/08 |
| 2002/0013687 A1 | * | 1/2002 | Ortoleva | E21B 41/0064 703/10 |

(Continued)

OTHER PUBLICATIONS

Liu et asl., "Dissipative particle dynamics simulation of fluid motion through an unsaturated fracture and fracture junction", Journal of Computational Physics 2007.*

(Continued)

*Primary Examiner* — Kandasamy Thangavelu
(74) *Attorney, Agent, or Firm* — Craig W. Roddy; Fish & Richardson P.C.

(57) ABSTRACT

Determining flow through a fracture junction in a complex fracture network. A flow of a fracturing fluid through a fracture junction of a complex fracture network is modeled using a fluid flow model that models flow based, in part, on mass balance and momentum balance. The fracture junction includes a first outlet to flow a first portion of the fracturing fluid and a second outlet to flow a second portion of the fracturing fluid. A ratio of a first volumetric flow rate of the first portion and a second volumetric flow rate of the second portion, and the pressure drop across the junction are determined in response to modeling the flow of the fracturing fluid through the fracture junction according to the fluid flow model. The determined ratio of flow rates and/or the determined pressure drop is provided.

20 Claims, 7 Drawing Sheets

(56) References Cited

U.S. PATENT DOCUMENTS

| | | | | |
|---|---|---|---|---|
| 2003/0131998 | A1* | 7/2003 | Nguyen | C09K 8/68 166/280.2 |
| 2008/0164021 | A1* | 7/2008 | Dykstra | E21B 43/267 166/250.1 |
| 2008/0183451 | A1* | 7/2008 | Weng | E21B 43/26 703/10 |
| 2009/0048126 | A1* | 2/2009 | Phatak | C09K 8/685 507/209 |
| 2011/0272159 | A1* | 11/2011 | Osiptsov | C09K 8/62 166/308.1 |
| 2012/0134749 | A1* | 5/2012 | Darrah | E21B 47/1015 405/80 |

OTHER PUBLICATIONS

Dragila et al., "Fluid motion through an unsaturated fracture junction", Water Resources Research, Feb. 2004.*

Huang et al., "Modeling of multiphase fluid motion in fracture intersections and fracture networks", Geophysical Research Letters, Oct. 2005.*

Stockman et al., "A lattice-gas and lattice Boltzmann study of mixing at continuous fracture junctions' Importance of boundary conditions", Geophysicalr Esearchl Etters, 1997.*

Oliveira, P.J., et al., "Pressure drop coefficient of laminar Newtonian flow in axisymmetric sudden expansions," Int. J. Heat and Fluid Flow 18, pp. 518-529, Mar. 1997, 12 pages.

Meng, C., et al., "Hydraulic Fracture Propagation in Pre-fractured Natural Rocks," SPE 140429, 44$^{th}$ U.S. Rock Mechanics Symposium and 5$^{th}$ U.S.-Canada Rock Mechanics Symposium, Jun. 27-30, 2010 [Abstract], 2 pages.

Smith, N.P., et al., "An Anatomically Based Model of Transient Coronary Blood Flow in the Heart," SIAM J. Appl. Math, vol. 62, No. 3, Feb. 2002, pp. 990-1018, 29 pages.

Sherwin, S.J., et al., "One dimensional modelling of a vascular network in space-time variables," Kluwer 2003, 42 pages.

* cited by examiner

US 9,418,184 B2

DETERMINING FLOW THROUGH A FRACTURE JUNCTION IN A COMPLEX FRACTURE NETWORK

TECHNICAL FIELD

This disclosure relates to fracturing fluid flow through a complex fracture network.

BACKGROUND

Oil and gas wells produce crude oil, natural gas and/or byproducts from subterranean petroleum reservoirs. Petroleum reservoirs, such as those containing oil and gas, typically include finite-dimensional, discontinuous, inhomogeneous, anisotropic, non-elastic (DIANE) rock formations. Such formations, in their natural state (prior to any fracture treatment), are characterized by natural fractures and faults of various sizes, shapes and orientations.

During a fracture treatment, fluids are pumped under high pressure into a rock formation through a well bore to further fracture the formations and increase permeability and production from the formation. The fracture growth is affected by the interaction between propagating hydraulic fracture and natural fracture. When net pressure of the fluid in an induced hydraulic fracture exceeds a critical net pressure (equal to the difference between the maximum and minimum horizontal stress), leakoff through natural fractures occurs. This leads to dilation of natural fractures and subsequently formation of complex fracture networks. Thus complex-fracture patterns can include networks of fractures that extend to the well bore, along multiple azimuths, in multiple different planes and directions, along discontinuities in rock, and in multiple regions of a reservoir.

Hydraulic fracturing treatment often is implemented as part of well completion in shale oil/gas field development. The fracturing treatment can be implemented, e.g., in a horizontal well and in multiple stages. Post fracturing, in addition to induced hydraulic fractures, the dilated natural fractures can provide additional pathways for hydrocarbon migration and hence production. Enhancing the fracture-formation area through complex fracture networks can improve fracturing treatment in shale reservoirs.

Several fracture monitoring tools such as microseismics, pressure analysis, and tracers are available to characterize the distribution of fractures and post-frac conductivity. Good data acquisition and interpretation can improve reliability of fracture diagnostics techniques.

BRIEF DESCRIPTION OF THE DRAWINGS

Like reference numbers and designations in the various drawings indicate like elements.

DETAILED DESCRIPTION

Figure 1:
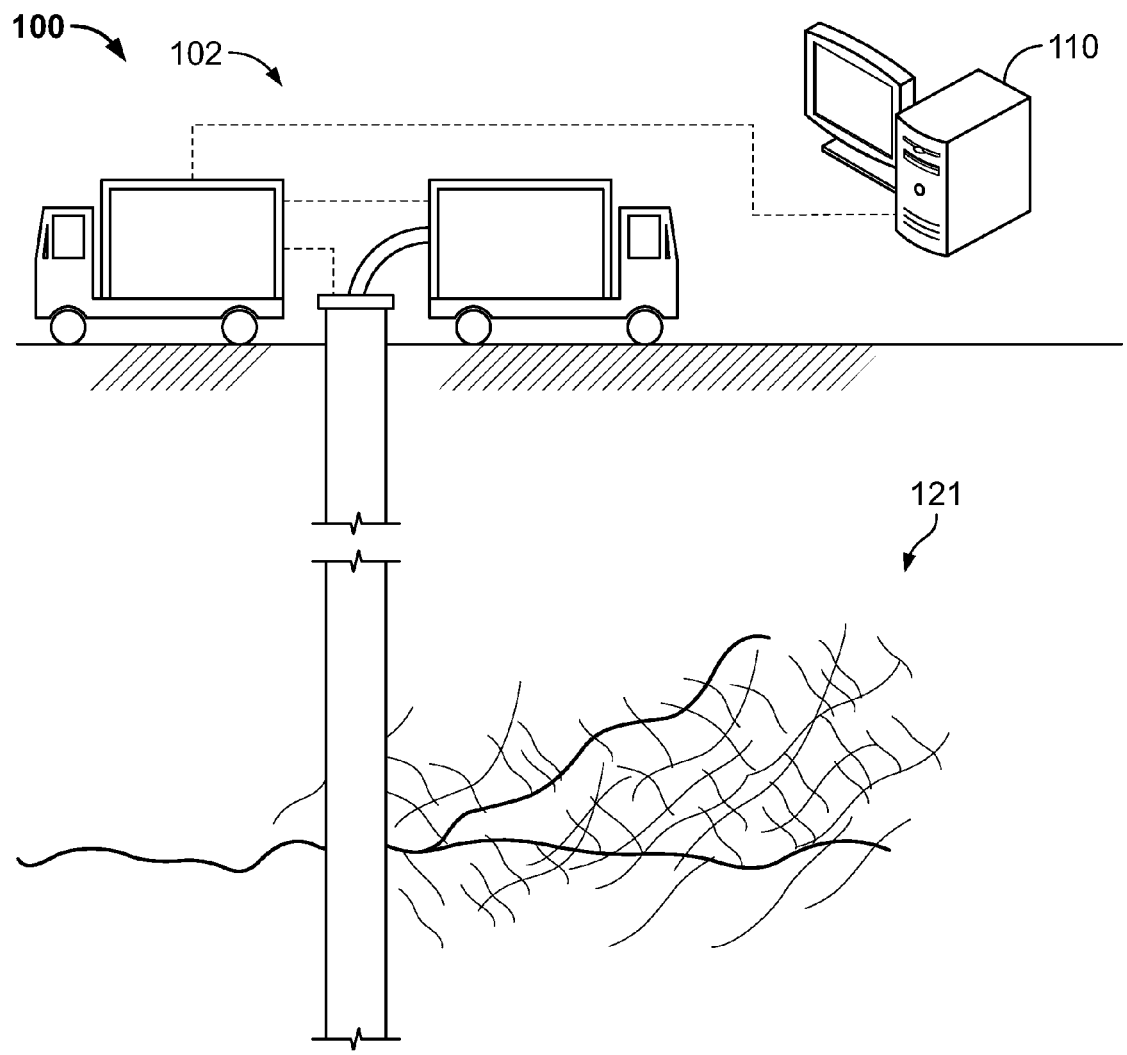
FIG. 1 illustrates an example well system.

This disclosure describes determining fracturing fluid flow through a fracture junction in a complex fracture network. An analytical model of fracturing fluid flow through the complex fracture network described below can be implemented, e.g., using a computer system, to estimate a pressure drop and a flow split at one or more or all fracture junctions in the complex fracture network. Flow of the fracturing fluid (with or without proppant) can be simulated as the fracturing fluid is being pushed through a subterranean formation.

Computer simulation of the fracturing can aid in the efficient implementation of fracturing in low-permeability formations. A basic hydraulic fracture model for a conventional reservoir combines fracture propagation, rock deformation, fluid flow, proppant transport and leak-off. Fluid flow in the fracture is often modeled as a simple Darcy flow or a fully developed slot flow. In the presence of discrete fracture networks, the fluid flow and pressure distribution is affected by the flow bifurcation at fracture junctions. Modeling fracturing fluid flow through the fracture junctions can enable optimizing the fracture treatment in naturally fractured reservoirs.

Some fracture simulators implemented using computer systems model and simulate flow through a fracture network by considering only mass balance at the fracture junctions but not pressure losses. Not considering the pressure losses can lead to prediction of incorrect pressure distribution, fracturing fluid flow rates and proppant transport.

The fluid flow model described here includes a mass balance component and a momentum balance component. Fluid flow in fractures is fully three-dimensional or at least two-dimensional. Nevertheless, the one-dimensional fluid flow model described here can be used as an alternative to or in addition to two- or three-dimensional models. In certain instances, the reduced dimensionality can decrease the resources needed and computational cost to solve the flow model while inviting models and correlations to reproduce the two-dimensional effects. The simplified model described here or correlations developed using the model (or both) can be combined with computational fluid dynamic (CFD) simulations for predicting the pressure distribution in fractures. The model can be applied to simulate flow of any stimulation fluid, e.g., water frac (slick water), conformance, acidizing fluids and particle-laden stimulating fluids (e.g., gel frac, linear frac and acid-gel frac). The model can also be extended for any other geometry occurring in the complex fracture network. The correlations can be based on rheological parameters of the fracturing fluid, e.g., viscosity, and geometric parameters of the fracture junction, e.g., fracture width.

The techniques described here can be implemented to account for momentum and mass balance by solving equations describing flow through a two-dimensional fracture junction having multiple outlets, and computing the flow split through the outlets and pressure loss. The simple, yet robust techniques described here can combine the use of CFD with lower/system level models for predicting the flow split and pressure drop at fracture junctions of any geometry, e.g., straight fracture junction, bent fracture junction, fracture junctions with one or more inlets or one or more outlets (or combinations of them). The resulting system level models can be used to improve the accuracy and reliability of the computer software applications that model and simulate fractures. The techniques can be applied to any fracturing fluid of any rheology, e.g., Newtonian, non-Newtonian (power-law, Carreau, or other non-Newtonian) fluid. The techniques can provide guidelines for improving the leak-off in natural fractures thereby increasing the production. The techniques can be implemented to design the proper proppant placement in fractures to inhibit (e.g., minimize or eliminate) screen-outs. The technique can provide guidelines for designing a fluid (such as, e.g., flow rates, rheology, and other similar fluid parameters) and proppant (such as, e.g., proppant size, concentration, and other similar proppant parameters) schedule for carrying out fracturing in naturally fractured formations.

FIG. 1 illustrates an example well system 100. The example well system 100 includes a treatment well 102 and/or one or more additional treatment wells. The well system 100 can include a computer system 110, which can include one or more computing devices located at one or more well sites and/or at one or more remote locations. In some implementations, the computer system 110 can implement a fluid flow model that models flow based, in part, on mass balance and momentum balance and a model of a complex fracture network. In some implementations, the model of the complex fracture network and the fluid flow model can be implemented by respective computer systems that can be connected to each other over one or more wired or wireless networks.

The computer system 110 can model a flow of a fracturing fluid through one or more fracture junctions of the complex fracture network according to a fluid flow model that includes a mass balance component and a momentum balance component. In addition, the computer system 110 can simulate a flow of a particular fracturing fluid through the one or more fracture junctions according to the fluid flow model. By doing so, the computer system 110 can validate the fluid flow model developed for the fracturing fluid and can also provide information describing the flow of the fracturing fluid through the complex fracture network.

Figure 2A:
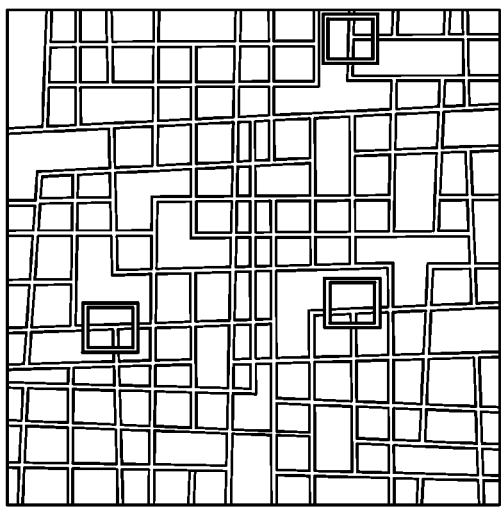
FIG. 2A illustrates a schematic of an example complex fracture network.
Figure 2B:
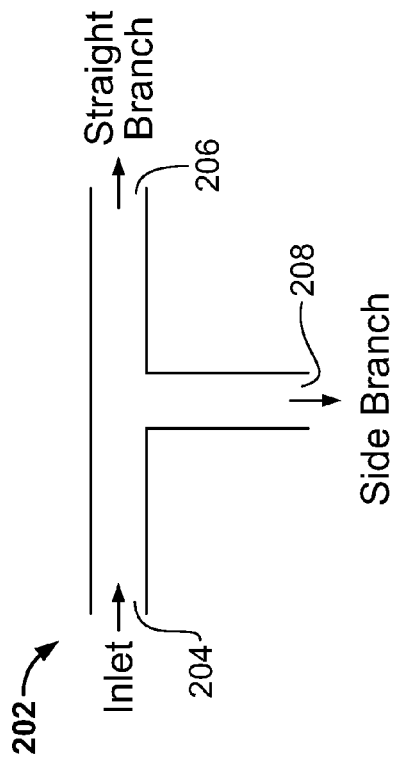
FIGS. 2B-2E illustrate schematics of example two-dimensional fracture junctions in the complex fracture network.
Figure 2C:
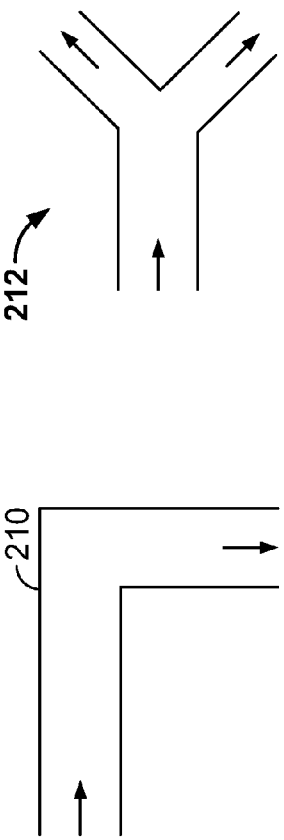
Figure 2D:
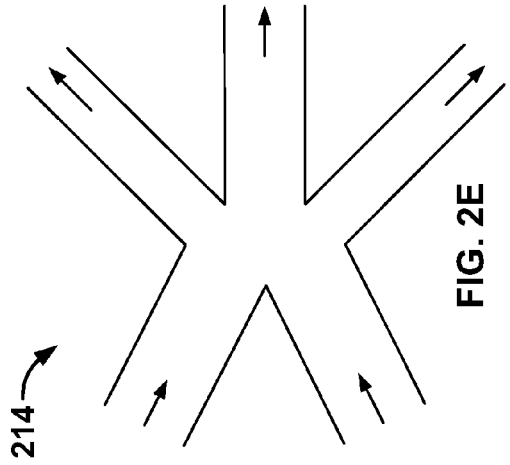
Figure 2E:
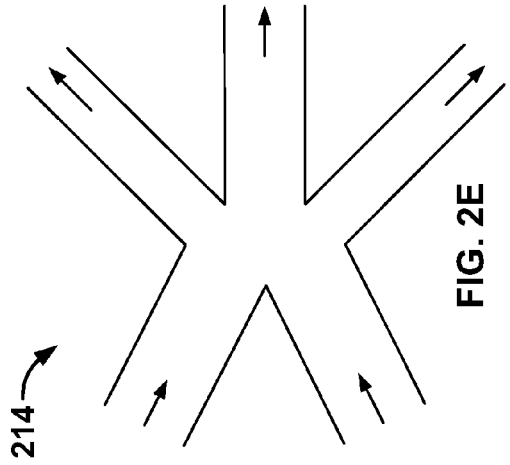

FIG. 2A illustrates a schematic of an example complex fracture network 200. The complex fracture network 200 includes multiple crossing fractures formed by fractures that are not parallel, such as occurs when a formation with natural fractures is hydraulically fractured. In this sense, the complexity of the fracture network 200 describes the crossing of natural and hydraulically-induced fractures, and not just a fracture network that is more than simple. FIGS. 2B-2E illustrate schematics of example two-dimensional fracture junctions in the complex fracture network. The complex fracture network in a subterranean formation (e.g., the subterranean region 121) can include multiple naturally occurring fractures and induced fractures. A fracture junction is a location in the fracture network at which two or more fractures intersect. A fracture junction can include one or more inlets into which a fracturing fluid can flow and one or more outlets, each connected to at least one of the one or more inlets, out of which the fracturing fluid can flow.

In some implementations, a fracture junction can be a T-junction 202 (FIG. 2B) having an inlet 204 into which the fracturing fluid can flow. The T-junction 202 can include a first outlet 206 and a second outlet 208. For example, the first outlet 206 and the second outlet 208 can be an outlet of a straight branch of the T-junction 202 and an outlet of a side branch of the T-junction 202, respectively, the straight branch being perpendicular to the side branch.

Figure 3:
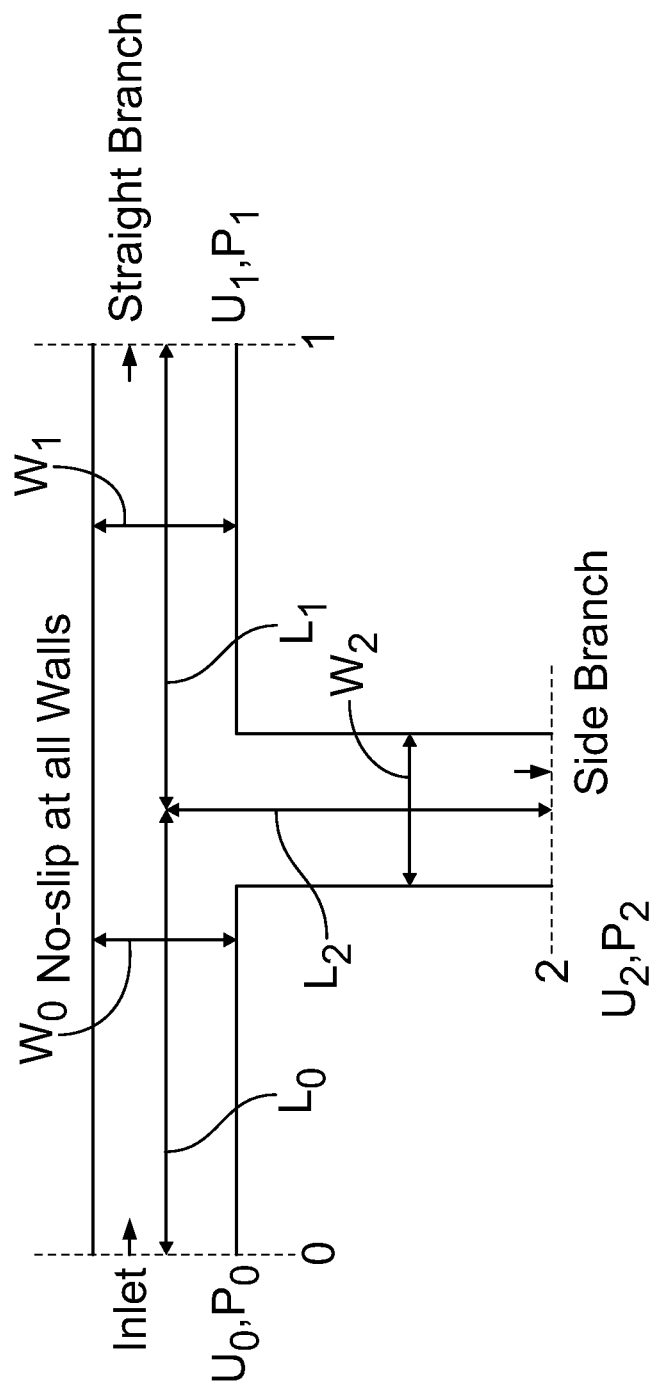
FIG. 3 illustrates a schematic of a T-junction.

Example dimensional variables associated with the T-junction 202 are shown in FIG. 3. The geometric and flow parameters associated with the T-junction 202 shown in FIG. 3 are presented in the table below.

| | Parameter | Definition |
|---|---|---|
| Inlet portion | $L_0$ | Inlet length |
| | $W_0$ | Inlet width |
| | $U_0$ | Inlet fluid flow velocity |
| | $P_0$ | Inlet fluid pressure |
| First outlet portion | $L_1$ | First outlet length |
| | $W_1$ | First outlet width |
| | $U_1$ | First outlet fluid flow velocity |
| | $P_1$ | First outlet fluid pressure |
| Second outlet portion | $L_2$ | Second outlet length |
| | $W_2$ | Second outlet width |
| | $U_2$ | Second outlet fluid flow velocity |
| | $P_2$ | Second outlet fluid pressure |

The fluid flow model described here is developed for a T-junction, e.g., the T-junction 202. The computer system 110 can implement the fluid flow model to determine a ratio of a volumetric flow rate of a first portion of fracturing fluid that flows through the first outlet 206 and a volumetric flow rate of a second portion of fracturing fluid that flows through the second outlet 208. Alternatively or in addition, the computer system 110 can implement the fluid flow model to determine a pressure drop between the first outlet 206 and an inlet 204, and a pressure drop between the second outlet 208 and the inlet 204. To do so, the computer system 110 can solve fluid flow equations (described below) that include a momentum balance component.

The governing equations for the incompressible fracturing fluid flow through the T-junction 202 are the continuity equation (Equation 1) and the steady-state momentum equation (Equation 2).

$$\nabla \cdot u = 0 \quad \text{(Equation 1)}$$

$$\rho(u \cdot \nabla u) = -\nabla p + \nabla \cdot \tau \quad \text{(Equation 2)}$$

where u, p and τ are the fluid velocity (vector), pressure, and stress tensor, respectively, ρ is the density of the fluid, and ∇ is a vector differential operator.

The computer system 110 implements no-slip boundary conditions at all walls. For the inlet 204 and the outlets (the first outlet 206 and the second outlet 208), the computer system 110 implements laminar inflow boundary conditions meaning that the flow is fully developed at all ends.

The computer system 110 can solve Equations 1 and 2 by executing a CFD simulation (e.g., a full scale or less than full scale CFD simulation) using, e.g., finite element method. The computer system 110 can use the information obtained by running the CFD simulation to obtain the additional pressure drop due to flow bifurcation, i.e., a split in the flow of the fracturing fluid that entered through the inlet 204 into the first outlet 206 and the second outlet 208. To do so, the computer system 110 can solve a macroscopic energy balance at the inlet and outlet planes represented by Equations 3 and 4.

$$p_0 + \frac{1}{2}\alpha\rho U_0^2 = p_1 + \frac{1}{2}\alpha\rho U_1^2 + \Delta p_{f,0} + p_{f,1} + \Delta p_{10} \quad \text{(Equation 3)}$$

$$p_0 + \frac{1}{2}\alpha\rho U_0^2 = p_2 + \frac{1}{2}\alpha\rho U_2^2 + \Delta p_{f,0} + p_{f,2} + \Delta p_{20} \quad \text{(Equation 4)}$$

In Equations 3 and 4, $p_0$, $p_1$, and $p_2$ represent pressures at the inlet 204, the first outlet 206 and the second outlet 208, respectively. Further, $U_0$, U, and $U_2$ represent average flow velocities at the inlet 204, the first outlet 206 and the second outlet 208, respectively. Correlis parameter is represented by α. The terms $\Delta p_{f,0}$, $\Delta p_{f,1}$, and $\Delta p_{f,2}$ represent frictional pressure drop when flow is fully developed in the absence of bifurcation. The terms $\Delta p_{10}$ and $\Delta p_{20}$ represent the pressure drop between the first outlet 206 and the inlet 204, and the pressure drop between the second outlet 208 and the inlet 204, respectively, due to flow bifurcation.

The pressure drop due to bifurcation, $\Delta p_{10}$ and $\Delta p_{20}$, are expressed in non-dimensional form as the loss coefficients $C_{10}$ and $C_{20}$ (Equations 5 and 6).

$$C_{10} = \frac{\Delta p_{10}}{\frac{1}{2}\rho U_0^2} \quad \text{(Equation 5)}$$

$$C_{20} = \frac{\Delta p_{20}}{\frac{1}{2}\rho U_0^2} \quad \text{(Equation 6)}$$

In some implementations, the computer system 110 can model the fracturing fluid as a Newtonian fluid, e.g., water. Alternatively, or in addition, the computer system 110 can model the fracturing fluid as a non-Newtonian fluid, e.g., Guar solution in water, associated with a rheological model. An example Carreau rheological model for Guar solution is shown in Equation 7.

$$\mu(\gamma) = \mu_\infty + (\mu_0 - \mu_\infty)[1 + (\lambda\gamma)^2]^{(n-1)/2} \quad \text{(Equation 7)}$$

where μ is the fluid viscosity at shear rate γ. $\mu_0$ and μ are the fluid viscosity at zero shear rate and asymptotic value at large shear rate, respectively and λ and n are the parameters of the Carreau model.

As described below, the ratio of the first volumetric flow rate to the second volumetric flow rate (i.e., the flow split) is defined based on a generalized Reynolds number ($Re_{gen}$), which is a non-dimensional parameter defined according to Equation 8 and Carreau number, $Cu = \lambda \gamma_w$.

$$Re_{gen} = \frac{\rho U_0^{2-n}}{6^{n-1} K\prime} = K\left(\frac{2n+1}{3n}\right)^n \quad \text{(Equation 8)}$$

where $$K\prime = K\left(\frac{2n+1}{3n}\right)^n$$

and $$K = \frac{\mu(\gamma)}{\gamma^{n-1}}$$

is the power-law rheology parameter.

The Reynolds number can be correlated to the ratio of the first volumetric flow rate to the second volumetric flow rate for the Newtonian fluid and the non-Newtonian fluid as shown in Equations 9 and 10, respectively.

$$\frac{Q_2}{Q_1} = \frac{1}{\left(1 + \frac{Re_{gen}}{1595}\right)^{3.84}} \quad \text{(Equation 9)}$$

$$\frac{Q_2}{Q_1} = \frac{1}{\left(1 + \frac{Re_{gen}}{311.5}\right)^2} \quad \text{(Equation 10)}$$

Figure 4A:
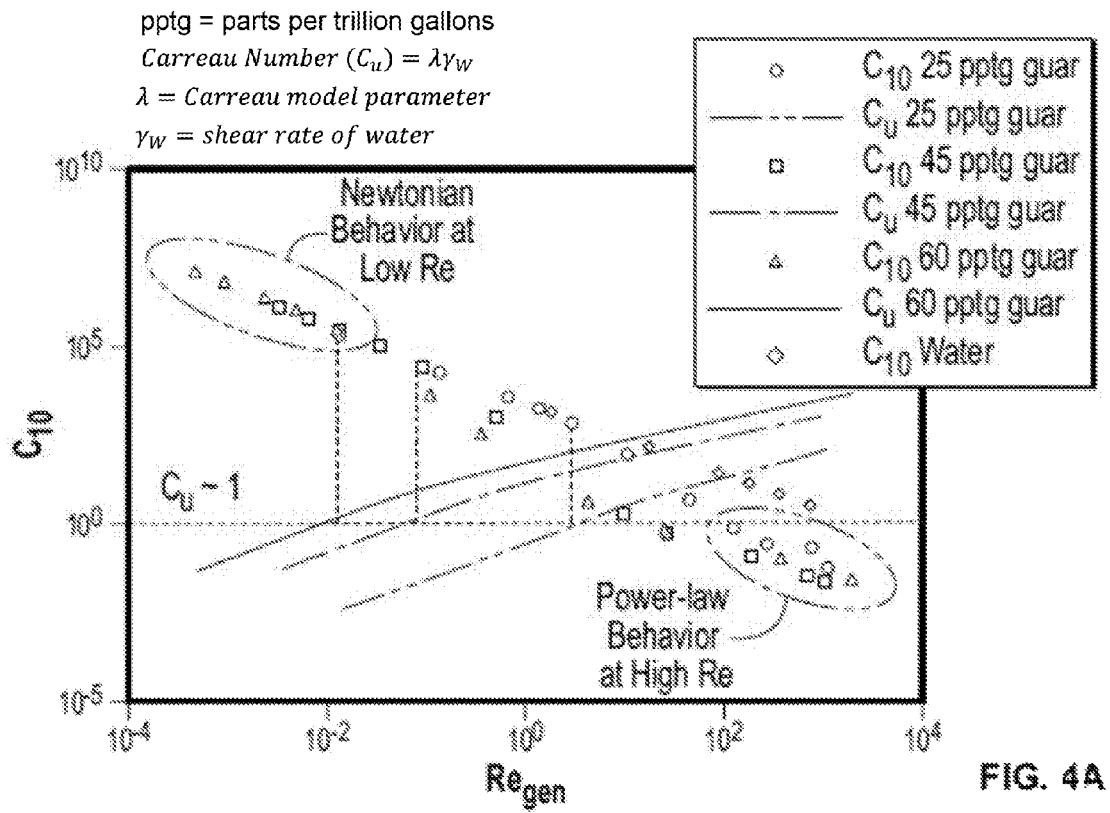
FIGS. 4A and 4B are example plots of loss coefficient and Carreau number versus the generalized Reynolds Number for guar solutions of various concentrations.
Figure 4B:
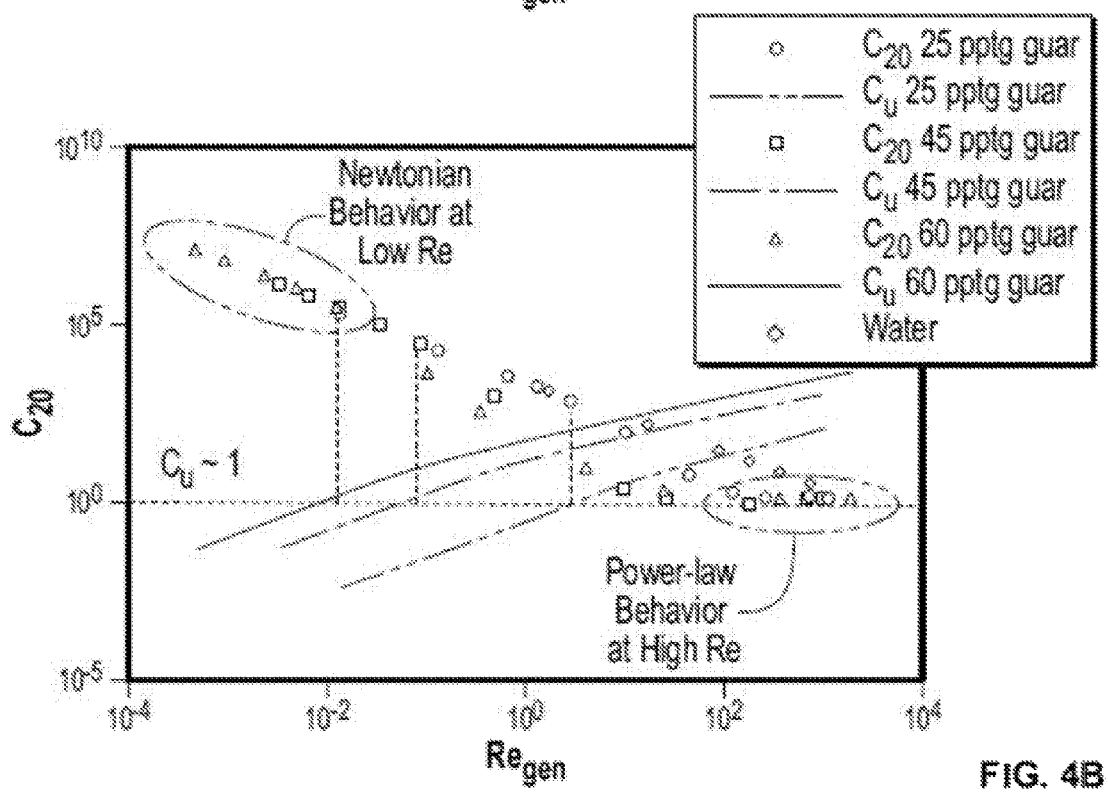
Figure 5:
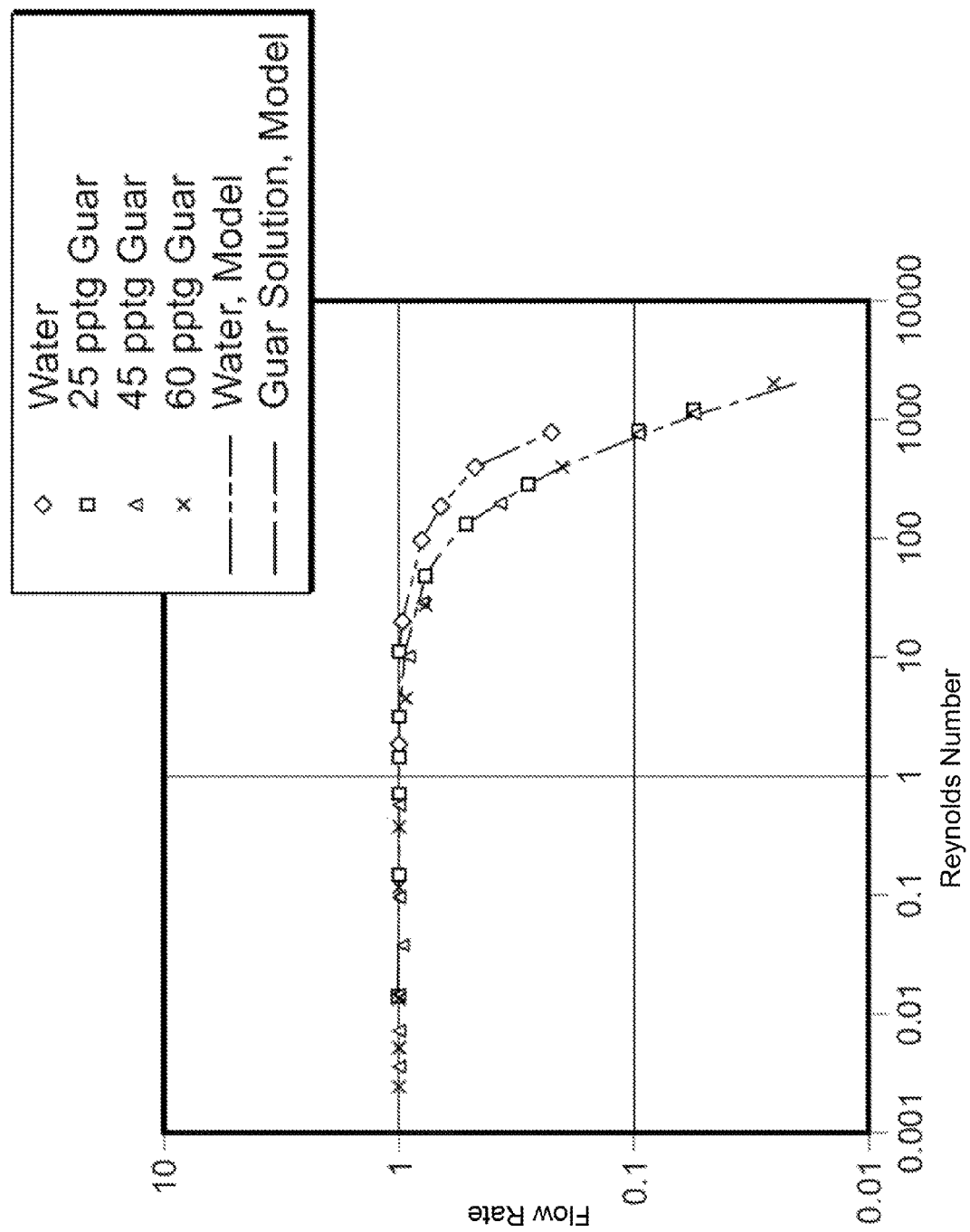
FIG. 5 is an example plot of the flow split through the T-junction as a function of generalized Reynolds Number.

FIGS. 4A and 4B are plots of loss coefficient and Carreau number versus the generalized Reynolds Number for guar solutions of various concentrations. In FIG. 4A, the X-axis shows Reynolds Number, particularly, $Re_{gen}$ described with reference to Equation 8, and the Y-axis shows loss coefficient $C_{10}$ described with reference to Equation 5. The loss coefficient for different guar solutions is represented by dots (circular, square, triangular and diamond-shaped dots). Also, in FIG. 4A, the solid and the dashed lines represent Carreau number values plotted against the Reynolds Numbers in the X-axis. In addition, in FIG. 4A, the guar solution is represented by parts per trillion gallons (pptg) of the fluid with which the guar is mixed. In FIG. 4B, the X-axis shows Reynolds Number, particularly, $Re_{gen}$ described with reference to Equation 8, and the Y-axis shows loss coefficient $C_{20}$ described with reference to Equation 6. The loss coefficient for different guar solutions is represented by dots (circular, square, triangular and diamond-shaped dots). Also, in FIG. 4B, the solid and the dashed lines represent Carreau number values plotted against the Reynolds Numbers in the X-axis. In addition, in FIG. 4B, the guar solution is represented by parts per trillion gallons (pptg) of the fluid with which the guar is mixed. FIG. 5 is a plot of the flow split as a function of generalized Reynolds Number. In FIG. 5, the X-axis shows Reynolds Numbers and the Y-axis shows flow rates of the fluids at the Reynolds Numbers on the X-axis. For small values of Reynolds number, the flow split is even but becomes asymmetric beyond a Reynolds number of 10. It is seen that as the $Re_{gen}$ increases, the asymmetry grows and practically very little flow goes through the side branch. This scenario can affect decisions regarding proppant and fracturing fluid pumping schedule. FIG. 5, for example, shows that a small incoming flow rate favors symmetric split that will improve leakage in natural fractures and lead to formation of complex networks. Post-fracture production increases with the degree of fracture complexity. Also, because of small flow rates in side fractures, the re-suspension of proppant can be small and most of the proppant can settle leading to blockage/screen out. This result combined with re-suspension models can provide valuable guidelines for operating fracturing fluid flow conditions in the fractures. FIG. 5 also shows that the model correlations (Equations 9 and 10) accurately predict the flow split. Similar results can be obtained with the use of these correlations as with running two-dimensional simulation demonstrating the usefulness of such correlations in one-dimensional fracture simulators including, e.g., Knoesis-Savvy™ fracture simulators.

Figure 6:
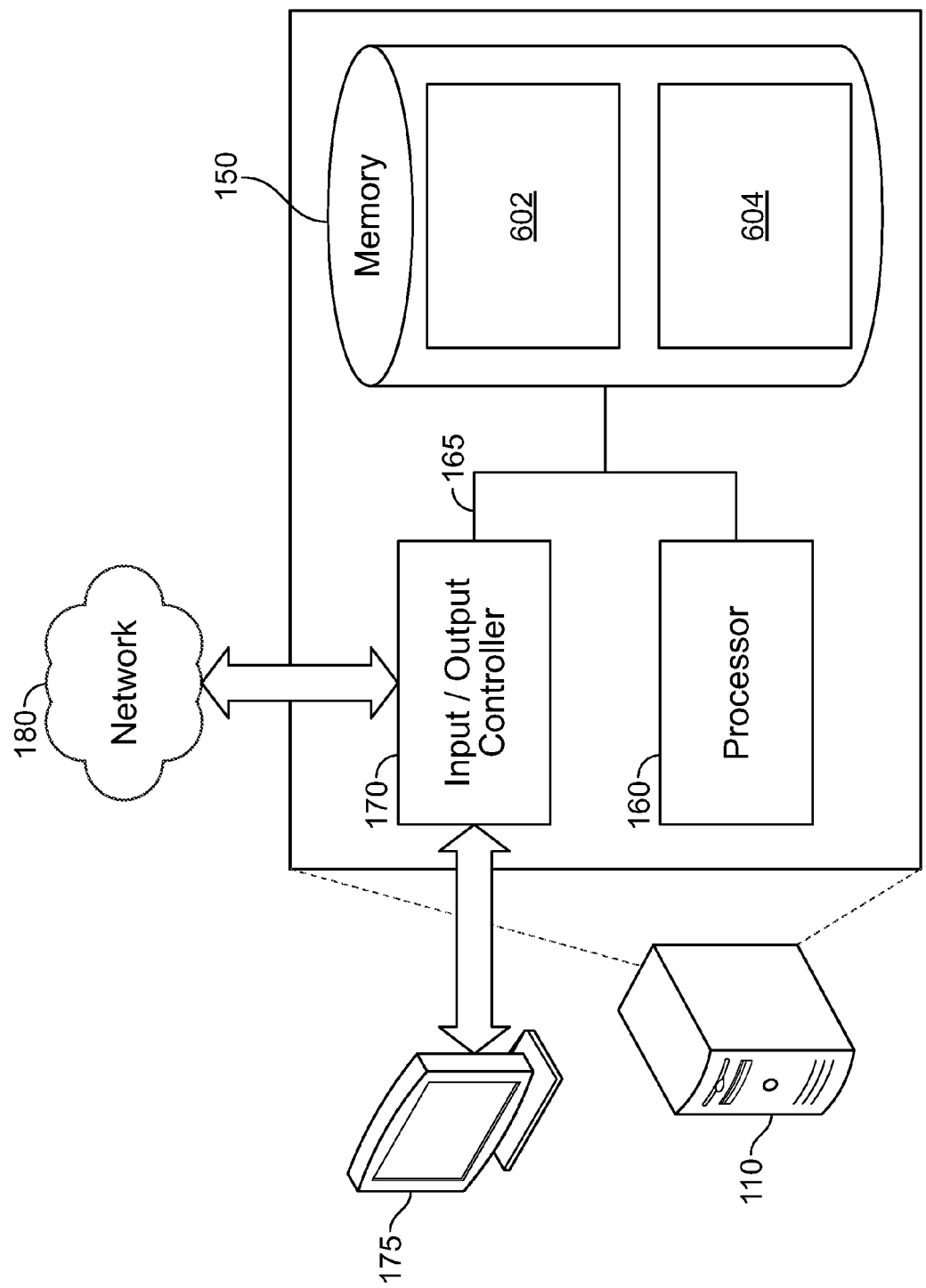
FIG. 6 illustrates a schematic of the example computer system of FIG. 1.

FIG. 6 illustrates a schematic of the example computer system 110 of FIG. 1. The example computer system 110 can be located at or near one or more wells of the well system 100 and/or at a remote location. The example computer system 110 includes a processor 160, a memory 150, and input/output controllers 170 communicably coupled by a bus 165. The memory can include, for example, a random access memory (RAM), a storage device (e.g., a writable read-only memory (ROM) and/or others), a hard disk, and/or another type of storage medium. The computer system 110 can be preprogrammed and/or it can be programmed (and reprogrammed) by loading a program from another source (e.g., from a CD-ROM, from another computer device through a data network, and/or in another manner). The input/output controller 170 is coupled to input/output devices (e.g., a monitor 175, a mouse, a keyboard, and/or other input/output devices) and to a network 180. The input/output devices receive and transmit data in analog or digital form over communication links such as a serial link, wireless link (e.g., infrared, radio frequency, and/or others), parallel link, and/or another type of link.

The network 180 can include any type of data communication network. For example, the network 180 can include a wireless and/or a wired network, a Local Area Network (LAN), a Wide Area Network (WAN), a private network, a public network (such as the Internet), a WiFi network, a network that includes a satellite link, and/or another type of data communication network. The network 180 can include some or all of the communication link 118 of FIG. 1.

The memory 150 can store instructions (e.g., computer code) associated with an operating system, computer applications, and/or other resources. The memory 150 can also store application data and data objects that can be interpreted by one or more applications and/or virtual machines running on the computer system 110. As shown in FIG. 6, the example memory 150 includes a model of the complex fracture network 602 or a fluid flow model 604 (or both), each implemented as computer-readable instructions executable by the processor 160. In some implementations, a memory of a computing device may include some or all of the information stored in the memory 150. In some implementations, the models can be stored on a computer-accessible repository (not shown) that is separate from the memory 150. The computer system 110 can be configured to obtain either the model of the complex fracture network or the fluid flow model (or both) from the repository over the network 180.

The processor 160 can execute instructions, for example, to generate output data based on data inputs. For example, the processor 160 can execute the model for the complex fracture network 602 or the fluid flow model 604 (or both) by executing and/or interpreting the software, scripts, programs, functions, executables, and/or other modules as which either or both models are implemented. The processor 160 may perform one or more of the operations described above. The input data received by the processor 160 and/or the output data generated by the processor 160 may include input from a user or input from one or both models.

Figure 7:
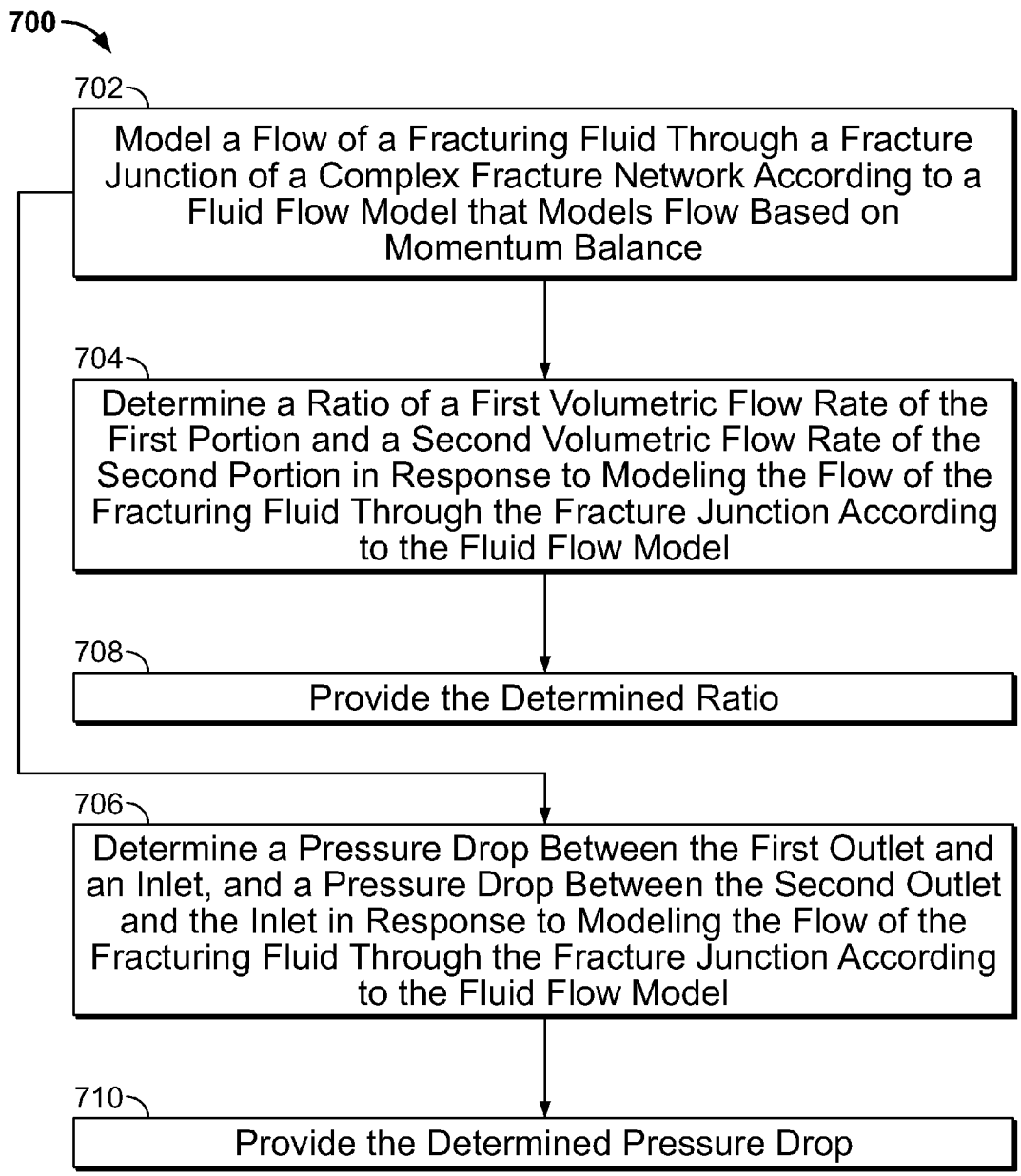
FIG. 7 is a flowchart of an example process to model fracturing fluid flow through a fracture junction.

FIG. 7 is a flowchart of an example process to model fracturing fluid flow through a fracture junction. For example, the fracture junction can include at least one inlet and multiple outlets to flow fracturing fluid therethrough. In some implementations, the fracture junction is a T-junction. The process 700 can be implemented by the computer system 110. At 702, a flow of a fracturing fluid through a fracture junction of a complex fracture network is modeled according to a fluid flow model that models flow based, in part, on mass balance and momentum balance. As described above, the fracture junction includes a first outlet configured to flow a first portion of the fracturing fluid and a second outlet configured to flow a second portion of the fracturing fluid. At 704, a ratio of a first volumetric flow rate of the first portion and a second volumetric flow rate of the second portion is determined in response to modeling the flow of the fracturing fluid through the fracture junction according to the fluid flow model. At 706, a pressure drop between the first outlet and an inlet, and a pressure drop between the second outlet and the inlet is determined in response to modeling the flow of the fracturing fluid through the fracture junction according to the fluid flow model. At 708, the determined ratio is provided, and, at 710, the determined pressure drops are provided, e.g., in response to input either from a user or from a computer software application that is executable to perform operations using the determined ratio (or both). For example, the determined ratio and/or the determined pressure drop or determined ratios and determined pressure drops across a range of input parameters (or combinations of them) can be displayed on a display device or graphically plotted, e.g., using a printing device.

In some implementations, the computer system 110 can determine the ratio of the first volumetric flow rate and the second volumetric flow rate before implementing a fracture treatment. The fracture conditions, e.g., the type of fracturing fluid, a flow rate of the fracturing fluid, the fracturing fluid viscosity, proppant content and size, the fracturing fluid pressure, and other similar conditions, can be adjusted based on the determined ratio. Alternatively or in addition, the number and characteristics of fracture treatment stages can be determined and/or adjusted. In some implementations, the computer system 110 can determine the ratio concurrently while a fracture treatment is being performed. Real-time inputs measured in real-time during the fracture treatment can be provided as inputs to the computer system 110. Based on the inputs, the computer system 110 can determine a revised ratio, which, in turn, can be used to revise the fracture conditions in real-time. In some implementations, the computer system 110 can determine the ratio after the fracture treatment has been implemented. Doing so can enable analyzing the implemented fracture treatment, for example, to determine if it met specified design goals for the treatment.

In the example implementations described with reference to the equations presented above, the fracture junction can be a T-junction having one inlet and two outlets, each connected to the inlet, and in which the straight branch was perpendicular to the side branch. Alternatively, a fracture junction can be a junction 210 with a 90° bend (FIG. 2C), a Y-junction 212 (or similar fracture junction with one inlet and two outlets), or a junction 214 that includes multiple inlets and multiple outlets, each outlet connected to at least one inlet. For example, for the junction 210 with a 90° bend, the fluid flow model developed for the T-junction 202 can be modified to exclude the straight branch of the T-junction 202 and the outlet 206 in the straight branch resulting in the junction 210 with the 90° bend. In another example, for the Y-junction 212, the fluid flow model developed for the T-junction 202 can be modified to change the perpendicularity between the straight and side branches of the T-junction 202. In a further example, the fluid flow model for the junction 214 can be developed by modifying the fluid flow model developed for the T-junction 202 to add at least one inlet and at least one outlet to the T-junction 202. The computer system 110 can be configured to model an outlet of a first fracture junction as an inlet of a second fracture junction. Alternatively, or in addition, the computer system 110 can be configured to model the outlet of the first fracture junction through a permeable portion of rock, e.g., as a leakoff.

A number of implementations have been described. Nevertheless, it will be understood that various modifications may be made without departing from the spirit and scope of the disclosure.

The invention claimed is:

1. A computer-implemented method comprising:
    modeling, by a computer system, a flow of a fracturing fluid through a fracture junction of a complex fracture network using a fluid flow model that models flow based, in part, on mass balance and momentum balance, the fracture junction comprising a first outlet to flow a first portion of the fracturing fluid and a second outlet to flow a second portion of the fracturing fluid;

determining, by the computer system, a ratio of a first volumetric flow rate of the first portion and a second volumetric flow rate of the second portion in response to modeling the flow of the fracturing fluid through the fracture junction according to the fluid flow model; and providing the determined ratio.

2. The method of claim 1, wherein modeling the flow of the fracturing fluid through the fracture junction comprises modeling the flow according to a model of the complex fracture network, the model comprising a plurality of two-dimensional fracture junctions.

3. The method of claim 2, wherein the plurality of two-dimensional fracture junctions comprise at least one of a second fracture junction comprising a three outlets or a third fracture junction comprising one outlet and having a 90° bend.

4. The method of claim 1, wherein modeling the flow of the fracturing fluid through the fracture junction of the complex fracture network comprises modeling the flow of the fracturing fluid through the fracture junction of the complex fracture network that comprises naturally occurring fractures and induced fractures.

5. The method of claim 1, wherein modeling the flow of the fracturing fluid through the fracture junction comprises modeling the flow of the fracturing fluid through the fracture junction which is a T-junction.

6. The method of claim 1, further comprising:
determining a pressure drop between the first outlet and an inlet, and a pressure drop between the second outlet and the inlet in response to modeling the flow of the fracturing fluid through the fracture junction according to the fluid flow model; and
providing the determined pressure drop between the first outlet and the inlet, and the determined pressure drop between the second outlet and the inlet.

7. The method of claim 1, wherein determining the ratio comprises determining the ratio before implementing a fracture treatment, while implementing a fracture treatment, or after implementing a fracture treatment using the fracture fluid.

8. The method of claim 1, further comprising adjusting flow parameters of the fracturing fluid in the fracture treatment based on the determined ratio.

9. The method of claim 1, wherein determining the ratio comprises determining a Reynolds Number ($Re_{gen}$) as a function of a flow velocity of the fracturing fluid through the fracture junction, a density of the fracturing fluid, and a Carreau number of the fracturing fluid.

10. The method of claim 9, wherein the Reynolds Number is represented by:

$$Re_{gen} = \frac{\rho U_0^{2-n}}{6^{n-1} K'},$$

wherein $\rho$ is the density of the fracturing fluid, $U_0$ is an average flow velocity of the fracturing fluid, n is a parameter of the Carreau model, $$K' = K \frac{2n+1}{3n}^n \text{ and } K = \frac{\mu(\gamma)}{\gamma^{n-1}}$$

is the power-law rheology parameter, and $\mu$ is the fluid viscosity at shear rate $\gamma$.

11. The method of claim 10, wherein the fracturing fluid is a Newtonian fluid, and wherein the determined ratio for the Newtonian fluid is $$\frac{1}{\left(1 + \frac{Re_{gen}}{1595}\right)^{3.84}}.$$

12. The method of claim 10, wherein the fracturing fluid is a non-Newtonian fluid, and wherein the determined ratio for the non-Newtonian fluid is $$\frac{1}{\left(1 + \frac{Re_{gen}}{311.5}\right)^{2}}.$$

13. The method of claim 12, wherein the fracturing fluid is guar solution.

14. The method of claim 12, wherein the fluid flow model includes a rheological model for the non-Newtonian fluid.

15. The method of claim 14, wherein the rheological model for the non-Newtonian fluid is $$\mu(\gamma) = \mu_\infty + (\mu_0 - \mu_\infty)[1 + (\lambda\gamma)^2]^{(n-1)/2},$$

where $\mu$ is the fluid viscosity at shear rate $\gamma$, $\mu_0$ and $\mu$ are the fluid viscosity at zero shear rate and asymptotic value at large shear rate, respectively and $\lambda$ and n are the parameters of the Carreau model.

16. A non-transitory computer-readable medium storing instructions executable by data processing apparatus to perform operations comprising:
modeling a flow of a fracturing fluid through a fracture junction of a complex fracture network using a fluid flow model that models flow based, in part, on mass balance and momentum balance, the fracture junction comprising a first outlet to flow a first portion of the fracturing fluid and a second outlet to flow a second portion of the fracturing fluid;
determining a pressure drop between the first outlet and an inlet, and a pressure drop between the second outlet and the inlet in response to modeling the flow of the fracturing fluid through the fracture junction according to the fluid flow model; and
providing the determined pressure drop between the first outlet and the inlet, and the determined pressure drop between the second outlet and the inlet.

17. The medium of claim 16, the operations further comprising:
determining a ratio of a first volumetric flow rate of the first portion and a second volumetric flow rate of the second portion in response to modeling the flow of the fracturing fluid through the fracture junction according to the fluid flow model; and
providing the determined ratio.

18. The medium of claim 16, wherein determining the ratio comprises determining a Reynolds Number ($Re_{gen}$) as a function of a flow velocity of the fracturing fluid through the fracture junction, a density of the fracturing fluid, a width of the fracture junction, and a Carreau number of the fracturing fluid, the Reynolds Number represented by $$Re_{gen} = \frac{\rho U_0^{2-n}}{6^{n-1} K'},$$

wherein ρ is the density of the fracturing fluid, $U_0$ is an average flow velocity of the fracturing fluid, n is a parameter of the Carreau model, $$K' = K \frac{2n+1}{3n}^n \text{ and } K = \frac{\mu(\gamma)}{\gamma^{n-1}}$$

is the power-law rheology parameter, the determined ratio being either $$\frac{1}{\left(1 + \frac{Re_{gen}}{1595}\right)^{3.84}}$$

for a Newtonian fluid or $$\frac{1}{\left(1 + \frac{Re_{gen}}{311.5}\right)^2}$$

for a non-Newtonian fluid.

19. A system comprising:
  data processing apparatus; and
  a computer-readable medium storing instructions executable by the data processing apparatus to perform operations comprising:
    modeling a flow of a fracturing fluid through a fracture junction of a complex fracture network using a fluid flow model that models flow based, in part, on mass balance and momentum balance, the fracture junction comprising a first outlet to flow a first portion of the fracturing fluid and a second outlet to flow a second portion of the fracturing fluid;
    determining a ratio of a first volumetric flow rate of the first portion and a second volumetric flow rate of the second portion in response to modeling the flow of the fracturing fluid through the fracture junction according to the fluid flow model, the ratio being a function of a Reynolds Number represented by $$Re_{gen} = \frac{\rho U_0^{2-n}}{6^{n-1} K'},$$

wherein ρ is the density of the fracturing fluid, $U_0$ is an average flow velocity of the fracturing fluid, n is a parameter of the Carreau model, $$K' = K \frac{2n+1}{3n}^n \text{ and } K = \frac{\mu(\gamma)}{\gamma^{n-1}}$$

is the power-law rheology parameter;
    determining a pressure drop between the first outlet and an inlet, and a pressure drop between the second outlet and the inlet in response to modeling the flow of the fracturing fluid through the fracture junction according to the fluid flow model; and
    providing the determined ratio, the determined pressure drop between the first outlet and the inlet, and the determined pressure drop between the second outlet and the inlet.

20. The system of claim 19, wherein the determined ratio is either $$\frac{1}{\left(1 + \frac{Re_{gen}}{1595}\right)^{3.84}}$$

for a Newtonian fluid or $$\frac{1}{\left(1 + \frac{Re_{gen}}{311.5}\right)^2}$$

for a non-Newtonian fluid.

* * * * *